324-77. SR 11-02-71 XR 3,617,656

United States Patent

[11] 3,617,656

[72] Inventors William S. Elliott
Cedar Rapids, Iowa;
Ronald F. Palmer, Ralston, Nebr.; Robert
H. Pool, Marion, Iowa

[21] Appl. No. 861,107
[22] Filed Sept. 25, 1969
[45] Patented Nov. 2, 1971
[73] Assignee Collins Radio Company
Dallas, Tex.

[54] TEST SPECTRUM RECOGNITION CIRCUIT FOR COMMUNICATION LINK ANALYZER
8 Claims, 5 Drawing Figs.

[52] U.S. Cl. 179/175.3, 324/77 E
[51] Int. Cl. H04m 1/24, H04m 3/22
[50] Field of Search 179/175.3; 324/77 E, 77 CS

[56] References Cited
UNITED STATES PATENTS

| | | | |
|---|---|---|---|
| 2,953,743 | 9/1960 | Desoer | 179/175.3 |
| 3,508,144 | 4/1970 | Mayer | 324/57 |
| 3,514,542 | 5/1970 | Farmer | 179/175.3 |

*Primary Examiner*—Kathleen H. Claffy
*Assistant Examiner*—Douglas W. Olms
*Attorneys*—Henry K. Woodward and Robert J. Crawford

ABSTRACT: In a communication link analyzer including a test signal generator for generating a frequency spectrum and a signal analysis unit for receiving said spectrum through a communication link, a signal recognition circuit is provided to recognize the presence of said spectrum. Tone channels and noise sampling channels are monitored, summed and compared by the signal recognition circuit.

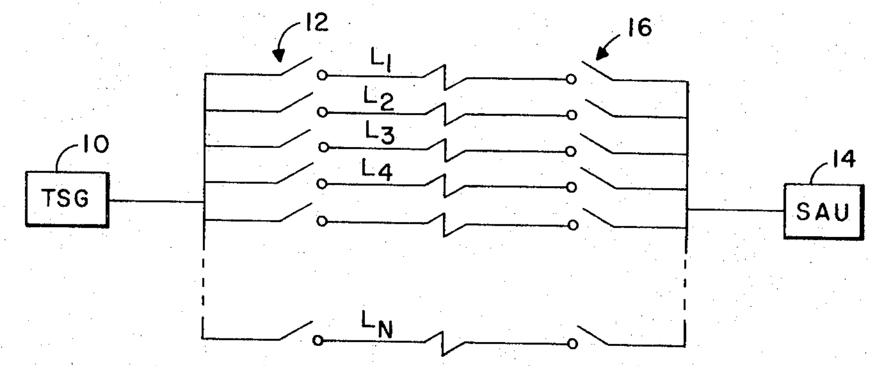
FIG. 1
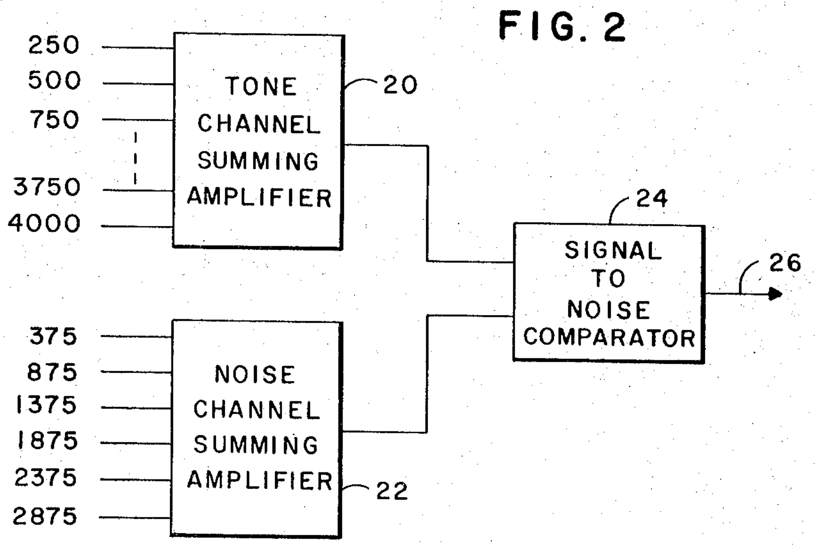
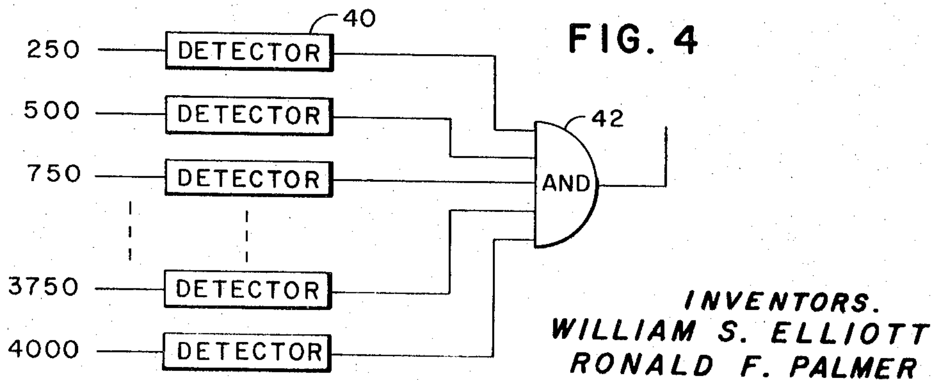
INVENTORS.
WILLIAM S. ELLIOTT
RONALD F. PALMER
ROBERT H. POOL
BY H. K. Woodward
ATTORNEY INVENTORS.
WILLIAM S. ELLIOTT
RONALD F. PALMER
ROBERT H. POOL
BY H. K. Woodward
ATTORNEY

TEST SPECTRUM RECOGNITION CIRCUIT FOR COMMUNICATION LINK ANALYZER

This invention relates generally to signal-receiving circuitry, and more particularly to means in combination with communication link analyzing means for identifying a signal which may be applied to a communication link for test purposes.

It is common practice to periodically test communication lines against established performance standards in order to detect or anticipate trouble in the lines. Such line characteristics as line loss, envelope delay, noise levels and the like are normally measured as a function of frequency. Since human response to noise on a telephone circuit, for example, is dependent on frequency, noise-weighting curves showing the relative interfering effect of noise as a function of frequency have been devised and become standards through the years. In the United States, such units as DBRN (decibels above reference noise), DBA (decibels adjusted), and DBRNC (decibels above reference noise-C message) have been employed with various standard test apparatus. Each of these units is based on relative noise interference at 1000 Hertz (Hz.). The reference power level in the U.S. telephone industry is standardized at $10^{112}$ watt or 90 db. below 1 milliwatt at 1000 Hertz.

Heretofore, communication lines have been tested manually. This has been expensive and time-consuming with time intervals between tests being rather drawn out. A communication link analyzer has been devised by Collins Radio Company which automatically tests and characterizes a communication link in less than one second. The analyzer includes a test signal generator which provides a signal spectrum spaced over a particular frequency band and a signal analysis unit which receives and analyzes the signal spectrum and provides a characterization of the communication link for the particular frequency band. The test signal generator is the subject of pending patent application Ser. No. 785,592, filed Dec. 20, 1968, and the signal analysis unit is the subject of pending application Ser. No. 793,529, filed Jan. 23, 1969. Both applications are assigned to the present assignee, Collins Radio Company.

Besides receiving the test signal spectrum, the signal analysis unit also measures and weights noise in the communication link, in accordance to desired frequency response characteristics, by sampling frequencies lying intermediate the test signal spectrum. The method and means for measuring weighted noise is the subject of pending application Ser. No. 816,728, filed Apr. 16, 1969, also assigned to the present assignee, Collins Radio Company.

Effective operation of the communication link analyzer requires means for detecting the presence of the test signal in a communication link. In an automated system, time must not be wasted in attempting to analyze a link not having the test signal. Further, the communication link analyzer must not cause overloading of a line being used for communication purposes. This could be a frequent problem where the communication link analyzer measurements are made for a large number of sequentially sampled telephone or data lines.

Accordingly, an object of this invention is means for indicating the presence or absence of a test signal spectrum in a communication link.

Another object of the invention is means in combination with a communication link analyzer for effectively employing said analyzer in an automatic operating mode.

Other objects and features of the invention will be apparent from the following description and appended claims.

Briefly, the signal recognition means is advantageously employed with a communication link analyzer as above described which utilizes a test signal spectrum and also measures noise at frequencies intermediate said test signal spectrum. The signal analysis portion of the communication link analyzer includes means for summing all signals at the test signal spectrum frequencies, and second means for summing the noise present at the noise sampling frequencies. Comparator means receives and compares the outputs of the first two means and determines the signal-to-noise ratio in the communication link, and in response to a signal-to-noise ratio above a preselected level said comparator means actuates the signal analysis portion. Means is also provided to minimize the possibility of error in sampling the communication link and determining the signal-to-noise ratio.

The invention will be more fully understood from the following detailed description and appended claims when taken with the drawing, in which:

FIG. 1 is a schematic block diagram of a communication link analyzer;

FIG. 2 is a schematic block diagram of one embodiment of the invention;

FIG. 4 is a schematic block diagram of another embodiment of the invention including means for minimizing the actuation of a communication link analyzer in response to spurious signals.

Figures 3, 5:
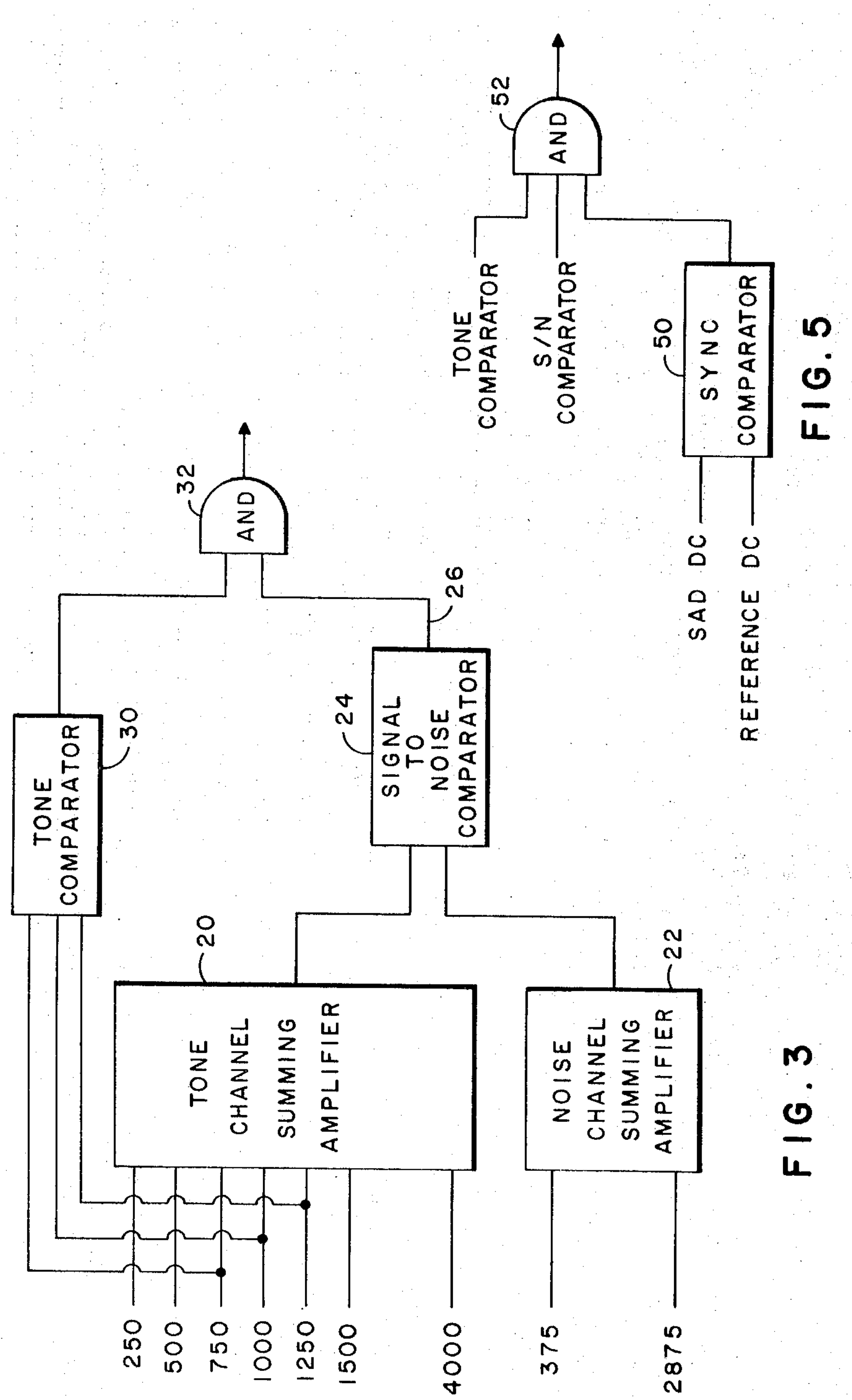
FIG. 3 is a schematic block diagram of another embodiment of the invention especially useful in analyzing telephone lines.
FIG. 5 is a schematic block diagram of means which may be included to indicate the presence of a locked loop condition.

Referring now to the drawing, FIG. 1 is a schematic functional block diagram of a communication link analyzer in which the present invention is advantageously employed. A test signal generator 10 is switchably connected by switch means 12 to one end of a plurality of communication lines $L_1$-$L_n$. At the receiving ends of the communication lines $L_1$-$L_n$, a signal analysis unit 14 is switchably connected thereto by means of switch means 16. Test signal generator 10 provides a test signal consisting of a periodic pulse stream with suitable spectral filtering so that the pulse response of the communication system may be examined simultaneously with the continuous wave response as determined by the characteristics of the received pulse train spectral composition. For example, in a communication link employing a frequency band of 4000 Hertz, the test signal generator may produce filtered pulses from 250 Hertz through 4000 Hertz at 250 Hertz intervals. The frequency response of a communication link is determined by the signal analysis unit through receiving and analyzing the pulse train transmitted by the test signal generator. Additionally, the noise characteristics of the communication link is analyzed by selectively sampling frequency ranges lying intermediate the signals of the pulse train.

In order for the communication link analyzer to be effectively utilized, the analysis of a link must be accomplished on a relatively short time scale. Further, the communication link analyzer most advantageously operates in an automatic mode to periodically analyze a relatively large number of communication links.

In an automatic mode of operation, the signal analysis unit must continuously search the various communication links for the presence of the test signal pulse train. In so doing, time must not be wasted in making measurements on a line which has no test signal applied thereto. Also, the signal analysis unit must not overload a line which is being used for communication purposes.

FIG. 2 is a schematic block diagram of test signal recognition means in accordance with the present invention which is advantageously employed with the aforedescribed communication link analyzer. The signal analysis unit is provided with a tone-channel-summing amplifier 20 having a plurality of inputs derived from the pulses of the test signal. A noise-channel-summing amplifier 22 is provided with a plurality of inputs derived from the frequencies employed in analyzing the noise characteristics of the communication link. The outputs of the two summing amplifiers are fed to a signal-to-noise comparator 24 which determines the signal-to-noise ratio in the particular communication link under examination, and in response to a signal-to-noise ratio above a preselected level, a signal is provided at the output 26 of the comparator which effects the operation of the signal analysis unit in analyzing the particular communication link being sampled. In one embodiment, the output of the two summing amplifiers 20 and 22 are equal for a 10 db. signal-to-noise ratio and are fed to the differential comparator 24 which determines which of the inputs is greater. If the input received from the tone-channel-summing amplifier is greater, the output of the signal-to-noise comparator 24 is a logic "1" or go condition. Conversely, if the signal received from the noise-channel-summing amplifier 22 is greater, the output of comparator 24 is a logic "0" or no-go condition, and accordingly, the operation of the signal analysis unit is thwarted.

It is common practice in the telephone industry to use a 1 kHz. tone for testing transmission lines; thus in using the communication link analyzer for testing telephone transmission lines, it may be possible for a strong 1 kHz. tone to provide a signal-to-noise ratio greater than 10 db. even though the other tones of the test signal spectrum were not present. This may be remedied by adding a tone comparator to the signal recognition means described above. As shown in FIG. 3, tone comparator 30 receives inputs from the 1000 Hertz channel input to the tone-summing amplifier 20 and inputs from the 750 Hertz and 1250 Hertz channels adjacent thereto. If the 1000 Hertz tone is present, but the adjacent tones are not present, the output of tone comparator 30 will be a "0" or no-go signal which is fed to one input of AND-gate 32. The second input to AND-gate 32 is taken from the output 26 of the signal-to-noise comparator 24. Thus, to effect operation of the signal analysis unit to analyze the particular communication link being examined, AND-gate 32 must receive a go signal from both signal-to-noise comparator 24 and tone comparator 30. It will be appreciated that tone comparator 30 may be provided with one or more frequency channels for comparison with the 1000 Hertz frequency channel.

It is possible that a signal may be present on the particular transmission line under examination which is similar to but not a test signal from the test signal generator. To eliminate the possibility of this problem, each tone channel may be connected through threshold detectors 40 to an AND-gate 42 as shown in FIG. 4. The output of AND-gate 42 is connected to one input of AND-gate 32 in FIG. 3 and the tone comparator 30 of FIG. 3 may then be eliminated. If any one of the tones of the test signal spectrum is below a specified threshold, a logic "0" is present as one input to AND-gate 42; consequently, the output of AND-gate 42 is also a logic "0". Low impedance connection of the signal analysis unit to the particular communication line under examination is thus blocked.

With the communication link in the automatic mode of operation, it may be desirable to know if the analyzer has effected a phase-locked loop before actual analysis of the link begins; that is, if the signal analysis unit has locked to the test signal of the test signal generator applied through the communication link. As shown in FIG. 5, this is accomplished by providing a sync comparator 50 which compares the DC voltage output of a synchronous amplitude detector of the signal analysis unit against a reference DC voltage level. When the loop is in lock, the output of sync comparator 50 is a logic "1" which is fed to one input of AND-gate 52 (comparable to AND-gate 32 of FIG. 3) which also receives inputs from the signal-to-noise comparator and the tone comparator. Thus, functioning of the signal analysis unit is blocked until the signal analysis unit locks to a test signal.

The signal recognition means in accordance with the present invention greatly facilitates the automatic operation mode of a communication link analyzer which employs a test signal spectrum. While the invention has been described with reference to a specific embodiment, the description is illustrative and not to be construed as limiting the scope of the invention. Various modifications and changes may occur to those skilled in the art without departing from the spirit and scope of the invention.

We claim:

1. Means for indicating the presence of a spectrum of discrete frequencies of electrical signals in a communication link comprising first summing means receiving signals on said link at the discrete frequencies of said spectrum and producing a first output signal analogous to the sum of said signals, second summing means receiving signals on said link at frequencies intermediate pairs of adjacent discrete frequencies of said spectrum and producing a second output signal analogous to the sum of said signals, and first comparison means for receiving and comparing said first and second output signals and producing a third output signal indicative of said comparison.

2. Means in accordance with claim 1 and further including second comparison means for receiving and comparing a plurality of signals at said discrete frequencies of said spectrum and producing a fourth output signal indicative of said comparison, and gate means for receiving said third output signal and said fourth output signal.

3. Means in accordance with claim 1 and further including a plurality of threshold detectors each connected to receive a signal in said spectrum, first gate means for receiving the outputs of said threshold detectors, and second gate means for receiving the output of said first comparison means and the output of said first gate means.

4. In a communication link analyzer including a test signal generator for concurrently generating a spectrum of discrete frequencies of electrical signals and a signal analysis unit for receiving said spectrum through a communication link, means in said signal analysis unit for recognizing the presence of said spectrum comprising first summing means receiving signals at the frequencies of said spectrum and producing a first output signal as a function of the sum of said signals, means for producing a reference voltage, and first comparison means for receiving and comparing said first output voltage and said reference voltage and producing a second output signal indicative of said comparison.

5. In a communication link analyzer including a test signal generator for generating a frequency spectrum of electrical signals and a signal analysis unit for receiving said spectrum through a communication link, means in said signal analysis unit for recognizing the presence of said spectrum as defined by claim 4 wherein said means for producing a reference voltage includes second summing means receiving signals at frequencies intermediate pairs of adjacent discrete frequencies of said spectrum and producing as a reference voltage a third output signal as a function of the sum of said signals.

6. In a communication link analyzer including a test signal generator for generating a frequency spectrum of electrical signals and a signal analysis unit for receiving said spectrum through a communication link, means in said signal analysis unit for recognizing the presence of said spectrum as defined by claim 4 and further including second comparison means for receiving and comparing a plurality of signals at said discrete frequencies of said spectrum and producing a fourth output signal indicative of said comparison, and gate means for receiving said second output signal and said fourth output signal.

7. In a communication link analyzer including a test signal generator for generating a frequency spectrum of electrical signals and a signal analysis unit for receiving said spectrum through a communication link, means in said signal analysis unit for recognizing the presence of said spectrum as defined by claim 6 and further including third comparison means for receiving and comparing a signal from said signal analysis unit indicative of locked loop between said test signal generator and said signal analysis unit through a communication link and a reference signal, said third comparison means generating a fifth output signal indicative of locked loop, and gate means for receiving said second, fourth, and fifth output signals.

8. In a communication link analyzer including a test signal generator for generating a frequency spectrum of electrical signals and a signal analysis unit for receiving said spectrum through a communication link, means in said signal analysis unit for recognizing the presence of said spectrum as defined by claim 4 and further including a plurality of threshold detectors each connected to receive a signal in said spectrum, first gate means for receiving the outputs of said threshold detectors, and second gate means for receiving the output of said first comparison means and the output of said first gate means.